(12) United States Patent
Yasuda et al.

(10) Patent No.: US 6,372,059 B1
(45) Date of Patent: Apr. 16, 2002

(54) HYDROGEN STORAGE ALLOY AND METHOD FOR PREPARATION THEREOF

(75) Inventors: Kiyotaka Yasuda; Yoshiki Sakaguchi; Akira Uchiyama; Daisuke Mukai; Shingo Kikugawa, all of Hiroshima (JP)

(73) Assignee: Mitsui Mining & Smelting Co., Ltd., Toyko (JP)

(*) Notice: Subject to any disclaimer, the term of this patent is extended or adjusted under 35 U.S.C. 154(b) by 0 days.

(21) Appl. No.: 09/582,880

(22) PCT Filed: Dec. 13, 1999

(86) PCT No.: PCT/JP99/06988

§ 371 Date: Jul. 6, 2000

§ 102(e) Date: Jul. 6, 2000

(87) PCT Pub. No.: WO00/36171

PCT Pub. Date: Jun. 22, 2000

(30) Foreign Application Priority Data

Dec. 15, 1998 (JP) .......................... 10-356058
Dec. 22, 1998 (JP) .......................... 10-365194

(51) Int. Cl.$^7$ .......................... C22C 19/03; H01M 4/02
(52) U.S. Cl. .................. 148/426; 148/555; 148/675; 420/455; 420/900
(58) Field of Search .................. 429/218; 420/900, 420/455; 148/426, 675, 555

(56) References Cited

U.S. PATENT DOCUMENTS 5,512,385 A * 4/1996 Komori et al. ............ 429/101
5,616,435 A * 4/1997 Matsuura et al. .......... 429/218
5,654,115 A * 8/1997 Hasebe et al. ............ 429/218
5,738,953 A * 4/1998 Lichtenberg et al. ....... 429/59

FOREIGN PATENT DOCUMENTS

| JP | 213319/97 | 8/1997 |
| JP | 9-298059 | 11/1997 |
| JP | 10-25528 | 1/1998 |
| JP | 10-298681 | 11/1998 |
| JP | 152533/99 | 6/1999 |
| JP | 11-310838 | 11/1999 |

* cited by examiner

*Primary Examiner*—Roy King
*Assistant Examiner*—Harry D. Wilkins, III
(74) *Attorney, Agent, or Firm*—Young & Thompson

(57) ABSTRACT

A hydrogen storage material which is an $AB_5$ type hydrogen storage alloy having a $CaCu_5$ type crystal structure represented by general formula:

$$MmNi_aMn_bAl_cCo_d$$

wherein Mm denotes a misch metal, $4.0 < a \leq 4.3$, $0.25 \leq b \leq 0.4$, $0.25 \leq c \leq 0.4$, $0.3 \leq d \leq 0.5$, and $5.05 \leq a+b+c+d \leq 5.25$, or general formula:

$$MmNi_aMn_bAl_cCo_dX_e$$

wherein Mm denotes a misch metal, X is Cu and/or Fe, $4.0 < a \leq 4.3$, $0.25 \leq b \leq 0.4$, $0.25 \leq c \leq 0.4$, $0.3 \leq d \leq 0.5$, $0 < e \leq 0.1$, and $5.05 \leq a+b+c+d+e \leq 5.25$, characterized in that the lattice length on the c-axis is 404.9 pm to 405.8 pm.

8 Claims, No Drawings

HYDROGEN STORAGE ALLOY AND METHOD FOR PREPARATION THEREOF

TECHNICAL FIELD

The present invention relates to a hydrogen storage material and a process for producing the same. More particularly, it relates to a hydrogen storage material which is, while with a minimized cobalt content, excellent in insusceptibility to grain size reduction and hydrogen storage characteristics (PCT characteristics) and exhibits not only excellent initial activity that is an important characteristic for use in a battery but high discharge characteristics for use in electric tools or low-temperature characteristics for use in hybrid electric vehicles, and a process for producing the same.

BACKGROUND ART

Nickel-hydrogen storage batteries (secondary batteries) having a hydrogen storage material in the anode have recently been attracting attention as high capacity alkaline storage batteries taking the place of nickel-cadmium storage batteries. The hydrogen storage materials that are currently used widely are composed of five elements, i.e., Mm (misch metal), Ni, Al, Mn, and Co.

Compared with La-based alloys, the Mm—Ni—Mn—Al—Co alloys enable constructing an anode out of relatively cheap materials and provide closed nickel-hydrogen storage batteries having a long cycle life and a suppressed inner pressure rise which is caused by gas generated in case of an overcharge and have therefore been used widely as an electrode material.

The Mm—Ni—Mn—Al—Co alloys currently used are designed to have a prolonged cycle life by preventing the alloys from reducing their grain size. It is generally known that about 10% by weight of Co (0.6 to 1.0 in an atomic ratio) is required to prevent the grain size reduction of the alloy. It is also accepted that a given amount of Co is necessary for securing excellent hydrogen storage characteristics and anticorrosion.

However, the material cost increases with the Co content, which is problematical from the aspect of material cost. Taking application of the hydrogen storage material to large batteries into consideration, such as the power source of electric vehicles, and the ever expanding market of nickel-hydrogen storage batteries, in particular, the material cost is weighty in choosing anode materials and has been a matter of concern.

To settle the above problem, Japanese Patent Application Laid-Open No. 213319/97 proposes altering the composition of the Mm—Ni—Mn—Al—Co alloy and adding thereto a small amount of an additional element. Use of the hydrogen storage material powder disclosed therein as an anode makes it feasible to reduce the Co content and yet to suppress deterioration of the anode caused by the alloy's reduction in grain size below a certain level and thereby to extent the cycle life of the battery.

Because the alloy of the composition disclosed in the 213319/97 does not always secure stability in its characteristics, the present inventors have proposed in Japanese Patent Application Lain-Open No. 152533/99 a composition and a production process for obtaining satisfactory initial activity, whereby a low-Co alloy has now come to be used in special applications.

However, where the hydrogen storage materials disclosed in the above publications (Laid-Open No. 213319/97 and Laid-Open No. 152533/99 are used, the batteries have insufficient discharge characteristics particularly in low temperature and cannot be used for electric tools needing high discharge characteristics or for hybrid electric vehicles.

DISCLOSURE OF THE INVENTION

Accordingly, an object of the present invention is to provide a hydrogen storage material of which the production cost is reduced by extremely decreasing its cobalt content and which exhibits excellent insusceptibility to grain size reduction, excellent hydrogen storage characteristics, satisfactory discharge characteristics, and satisfactory initial activation and a process for producing the same.

As a result of extensive studies, the present inventors have found that the above object is accomplished by a hydrogen storage material of $AB_5$ structure having a specific stoichiometric composition (B site rich), particularly a composition of $4.0 < Ni \leq 4.3$ and $0.25 \leq Mn \leq 0.4$, and the c-axis of which is in a given range. They have also found that such a hydrogen storage material is obtainable with the above-described specific composition when a casting temperature and heat treating conditions satisfy a given relationship.

The present invention has been reached based on the above findings and provides a hydrogen storage material which is an $AB_5$ type hydrogen storage alloy having a $CaCu_5$ type crystal structure represented by general formula:

$$MmNi_aMn_bAl_cCo_d$$

wherein Mm denotes a misch metal, $4.0 < a \leq 4.3$, $0.25 \leq b \leq 0.4$, $0.25 \leq c \leq 0.4$, $0.3 \leq d \leq 0.5$, and $5.05 \leq a+b+c+d \leq 5.25$, or general formula:

$$MmNi_aMn_bAl_cCo_dX_e$$

wherein Mm denotes a misch metal, X is Cu and/or Fe, $4.0 < a \leq 4.3$, $0.25 \leq b \leq 0.4$, $0.25 \leq c \leq 0.4$, $0.3 \leq d \leq 0.5$, $0 < e \leq 0.1$, and $5.05 \leq a+b+c+d+e \leq 5.25$,
characterized in that the lattice length on the c-axis is 404.9 pm or more.

The present invention also provides a preferred process for producing the hydrogen storage material of the present invention which comprises heat-melting raw materials of a hydrogen storage material, casting the melt, and heat treating the resulting alloy in an inert gas atmosphere to produce an $AB_5$ type hydrogen storage material having a $CaCu_5$ type crystal structure represented by the following general formulae, characterized in that the casting temperature is 1350 to 1550° C., the pouring temperature is 1230 to 1430° C., and conditions of said heat treating are 1070 to 1100° C. and 1 to 6 hours. General formula:

$$MmNi_aMn_bAl_cCo_d$$

wherein Mm denotes a misch metal, $4.0 < a \leq 4.3$, $0.25 \leq b \leq 0.4$, $0.25 \leq c \leq 0.4$, $0.3 \leq d \leq 0.5$, and $5.05 \leq a+b+c+d \leq 5.25$, or general formula:

$$MmNi_aMn_bAl_cCo_dX_e$$

wherein Mm denotes a misch metal, X is Cu and/or Fe, $4.0 < a \leq 4.3$, $0.25 \leq b \leq 0.4$, $0.25 \leq c \leq 0.4$, $0.3 \leq d \leq 0.5$, $0 < e \leq 0.1$, and $5.05 \leq a+b+c+d+e \leq 5.25$.

The Best Mode for Carrying out the Invention:

In the above formulae, Mm donates a misch metal, a mixture of rare earth elements such as La, Ce, Pr, Nd, and Sm. The hydrogen storage material is an $AB_5$, type hydrogen storage alloy having a $CaCu_5$ type crystal structure having a B site-rich nonstoichiometric composition of $AB_{5.05}$ to $AB_{5.25}$.

In this hydrogen storage material, the compositional ratio (atomic ratio) of $Ni_a Mn_b M_c Co_d$ fulfills the following relationships. The ratio of Ni: $4.0 < a \leq 4.3$. The ratio of Mn: $0.25 \leq b \leq 0.4$. The ratio of Al: $0.25 \leq c \leq 0.4$. The ratio of Co: $0.3 \leq d \leq 0.5$. (a+b+c+d) is in a range of from 5.05 to 5.25.

The compositional ratio (atomic ratio) of $Ni_a Mn_b Al_c Co_d X_e$ (wherein X is Cu and/or Fe) satisfies the following relationships. The ratio of Ni: $4.0 < a \leq 4.3$. The ratio of Mn: $0.25 \leq b \leq 0.4$. The ratio of Al: $0.25 \leq c \leq 0.4$. The ratio of Co: $0.3 \leq d \leq 0.5$. The ratio of X: $0 < e \leq 0.1$. (a+b+c+d+e) is in a range of from 5.05 to 5.25.

As described above, the ratio of Ni, a, is from 4.0 to 4.3, desirably from 4.1 to 4.2. If a is less than 4.0, the discharge characteristics are not satisfactory. If it exceeds 4.3, deterioration in insusceptibility to grain size reduction or life characteristics is observed.

The ratio of Mn, b, is from 0.25 to 0.4. If b is less than 0.25, the plateau pressure increases, and the hydrogen storage capacity is reduced. If it exceeds 0.4, the alloy undergoes considerable corrosion so that the battery voltage greatly decreases during storage.

The ratio of Al, c, is from 0.25 to 0.4. If c is smaller than 0.25, the plateau pressure, which is the hydrogen release pressure of a hydrogen storage material, increases to deteriorate energy efficiency in charges and discharges. If it exceeds 0.4, the hydrogen storage capacity is reduced.

The ratio of Co, d, is 0.3 to 0.5. If d is less than 0.3, the hydrogen storage characteristics or the resistance to grain size reduction are deteriorated. If it exceeds 0.5, the ratio of Co is too high to realize cost reduction.

The ratio of X, e, is from 0 up to 0.1. If e is more than 0.1, the discharge characteristics are impaired, and the hydrogen storage capacity is reduced. (a+b+c+d) or (a+b+c+d+e) (these sums will hereinafter be sometimes referred to as x, inclusively) is from 5.05 to 5.25. If x is smaller than 5.05, the battery life or the insusceptibility to grain size reduction is ruined. If x is greater than 5.25, the hydrogen storage characteristics are reduced and, at the same time, the discharge characteristics are also deteriorated.

The hydrogen storage material of the present invention has a lattice length on the c-axis of 404.9 pm or more, preferably 404.9 to 405.8 pm. If the lattice length on the c-axis is shorter than 404.9 pm, the alloy has poor insusceptibility to grain size reduction and reduced initial activation (relative magnetization). Hydrogen storage materials whose c-axis lattice length exceeds 405.8 pm are not only difficult to produce but have greatly reduced hydrogen storage capacity.

The c-axis lattice length of the hydrogen storage material has different preferred ranges according to the value of (a+b+c+d) or (a+b+c+d+e), i.e., the value x. The value x being 5.05 or greater and smaller than 5.15, the c-axis lattice length is preferably 404.9 or greater and smaller than 405.4 pm. The value x ranging from 5.15 to 5.25, the c-axis lattice length is preferably 405.4 to 405.8 pm.

Although the lattice length on the a-axis of the hydrogen storage material of the present invention is not particularly limited, it is usually from 500.3 to 501.0 pm.

The process of producing the hydrogen storage material of the present invention is then described.

Raw materials of the hydrogen storage material are weighed to give the alloying composition described above and mixed up. The mixture is melted into a melt by means of a high frequency induction furnace based on induction heating. The melt is poured into a casting mold, for example, a mold of water cooling type at a casting temperature of 1350 to 1550° C. to obtain a hydrogen storage material. The pouring temperature is 1200 to 1450° C. The term "casting temperature" as used herein means the temperature of the melt in the crucible at the beginning of casting, and the term "pouring temperature" means the temperature of the melt at the inlet of the casting mold (i.e., the temperature of the melt before entering the casting mold).

The resulting hydrogen storage material is heat treated in an inert gas atmosphere, for example, in argon gas under heat treating conditions of 1070 to 1100° C. and 1 to 6 hours. The cast alloy structure usually shows fine grain boundary segregation chiefly of Mn. The heat treatment is to level the segregation by heating.

There is thus obtained a hydrogen storage material which has a reduced cobalt content and yet exhibits excellent insusceptibility to grain size reduction, excellent hydrogen storage characteristics, satisfactory discharge characteristics, and satisfactory initial activation.

The hydrogen storage material, after crushed and pulverized, is suitably used as an anode of high-discharge alkaline storage batteries. The alkaline storage batteries thus provided are satisfactory in initial activation and low-temperature high-rate characteristics, and the anode of which is prevented from deterioration due to the alloy getting finer and therefore secures a long cycle life.

The present invention will further be illustrated in the concrete by way of Examples and the like.

EXAMPLES 1-1 to 1-4, COMPARATIVE EXAMPLES 1-1 to 1-2, AND REFERENCE EXAMPLES 1-1 to 1-3

Raw materials of a hydrogen storage material were weighed to make an alloying composition of $MmNi_{4.13}Mn_{0.35}Al_{0.32}Co_{0.4}$ (AB5.2) and mixed up. The mixture was put in a crucible, and the crucible was set in a high frequency melting furnace. After evacuating to a degree of vacuum of $10^{-4}$ to $10^{-5}$ Torr, the mixture was heat melted in an argon gas atmosphere and cast into a copper casting mold of water cooling type at 1350° C. (pouring temperature: 1250° C.) to obtain an alloy. The resulting alloy was heat treated in an argon atmosphere under the conditions shown in Table 1 to obtain a hydrogen storage material. Reference Example 1-1 shows the characteristics of a conventional alloy containing 10 wt % of Co, and Reference Examples 1-2 and 1-3 show the characteristics of conventional alloys containing 5 wt % of Co.

EXAMPLES 2-1 TO 2-3 AND COMPARATIVE EXAMPLES 2-1 TO 2-2

Hydrogen storage materials were obtained in the same manner as in Example 1-2, except for changing the pouring temperature as shown in Table 2.

EXAMPLES 3-1 TO 3-4 AND COMPARATIVE EXAMPLES 3-1 TO 3-2

Hydrogen storage materials were obtained in the same manner as in Example 1-2, except for changing the stoichiometric ratio as shown in Table 3.

EXAMPLES 4-1 TO 4-4 AND COMPARATIVE EXAMPLES 4-1 to 4-2

Hydrogen storage materials were obtained in the same manner as in Example 1-2, except for changing the alloy composition to $MmNi_{4.13}Mn_{0.35-y}Al0.32Co0.4X_y$ ($AB_{5.2}$) (X: Fe or Cu), wherein y was varied as shown in Table 4. Evaluation of Characteristics:

The PCT capacity, the relative magnetization, and the grain size retention of the hydrogen storage materials obtained in Examples and Comparative Examples were determined in accordance with the following methods. Evaluation of Examples and Comparative Examples was made based on the data of the conventional 10 wt % Co-containing hydrogen storage material—PCT capacity: 0.82 to 0.83; and grain size retention: 0.90 to 0.91. The results obtained are shown in Tables 1 to 4.

PCT Capacity:

Calculated from the hydrogen absorption isotherm measured at 45° C. H/M: 0 to 0.5 MPa.

Relative Magnetization:

The hydrogen storage material was ground to powder and surface treated. Magnetization attributed to residual Ni and Co was measured and relatively expressed in terms of a ratio to the magnetization of the above-described 10% Co-containing hydrogen storage material powder.

Grain Size Retention:

Hydrogen gas of 30 bar was introduced into the hydrogen storage material having a grain size adjusted to 22 to 53 micrometers in a PCT apparatus and then desorbed therefrom. Hydrogen absorption and desorption were repeated 10 times, and the ratio of the average grain size after the cycle test to that before the cycle test was obtained.

TABLE 1

| Example & Compara. Example | Heat Treatment (° C.-hr) | B/A | Lattice Length (a/pm) | Lattice Length (c/pm) | PCT Capacity (H/M) | Grain Size Retention (%) | Relative Magnetization (%) | Discharge Characteristics (mAh/g) |
|---|---|---|---|---|---|---|---|---|
| Ref. Ex. 1-1 | 1060-3 | 5.0 | 499.1 | 405.6 | 0.82 | 92 | 100 | 215 |
| Ref. Ex. 1-2 | 1060-3 | 5.2 | 500.9 | 406.3 | 0.82 | 92 | 82 | 180 |
| Ref. Ex. 1-3 | 1080-3 | 5.2 | 500.9 | 406.4 | 0.82 | 93 | 83 | 170 |
| Compa. Ex. 1-1 | 1060-3 | 5.2 | 500.7 | 404.6 | 0.84 | 82 | 93 | 231 |
| Ex. 1-1 | 1070-3 | 5.2 | 500.5 | 405.6 | 0.82 | 94 | 104 | 218 |
| Ex. 1-2 | 1080-3 | 5.2 | 500.5 | 405.5 | 0.82 | 95 | 106 | 220 |
| Ex. 1-3 | 1090-3 | 5.2 | 500.3 | 405.4 | 0.82 | 96 | 103 | 217 |
| Ex. 1-4 | 1100-3 | 5.2 | 500.4 | 405.5 | 0.81 | 97 | 99 | 210 |
| Compa. Ex. 1-2 | 1120-3 | 5.2 | 500.7 | 404.4 | 0.83 | 84 | 85 | 231 |

TABLE 2

| Example & Compara. Example | Pouring Temp. (° C.) | B/A | Lattice Length (a/pm) | Lattice Length (c/pm) | PCT Capacity (H/M) | Grain Size Retention (%) | Relative Magnetization (%) | Discharge Characteristics (mAh/g) |
|---|---|---|---|---|---|---|---|---|
| Comp. Ex. 2-1 | 1180 | 5.2 | 500.7 | 404.6 | 0.84 | 90 | 93 | 190 |
| Ex. 2-1 | 1230 | 5.2 | 500.5 | 405.6 | 0.82 | 94 | 103 | 217 |
| Ex. 2-2 | 1330 | 5.2 | 500.5 | 405.7 | 0.82 | 93 | 106 | 219 |
| Ex. 2-3 | 1430 | 5.2 | 500.3 | 405.5 | 0.82 | 92 | 102 | 216 |
| Comp. Ex. 2-2 | 1480 | 5.2 | 500.6 | 404.8 | 0.81 | 83 | 84 | 203 |

TABLE 3

| Example & Compara. Example | Heat Treatment (° C.-hr) | B/A | Lattice Length (a/pm) | Lattice Length (c/pm) | PCT Capacity (H/M) | Grain Size Retention (%) | Relative Magnetization (%) | Discharge Characteristics (mAh/g) |
|---|---|---|---|---|---|---|---|---|
| Comp. Ex. 3-1 | 1080-3 | 5.00 | 501.4 | 404.6 | 0.88 | 83 | 107 | 240 |
| Ex. 3-1 | 1080-3 | 5.05 | 501.2 | 404.9 | 0.86 | 92 | 103 | 229 |
| Ex. 3-2 | 1080-3 | 5.10 | 500.8 | 405.1 | 0.85 | 91 | 106 | 219 |
| Ex. 3-3 | 1080-3 | 5.15 | 500.6 | 405.4 | 0.83 | 93 | 106 | 217 |
| Ex. 3-4 | 1080-3 | 5.25 | 500.1 | 405.7 | 0.80 | 95 | 102 | 216 |
| Comp. Ex. 3-2 | 1080-3 | 5.30 | 499.2 | 406.0 | 0.78 | 96 | 84 | 193 |

TABLE 4

| Example & Compara. Example | Heat Treatment (° C.-hr) | $X_y$ (molar ratio) | Lattice Length (a/pm) | Lattice Length (c/pm) | PCT Capacity (H/M) | Grain Size Retention (%) | Relative Magnetization (%) | Discharge Characteristics (mAh/g) |
|---|---|---|---|---|---|---|---|---|
| Ex. 4-1 | 1080-3 | Fe 0.05 | 500.4 | 405.6 | 0.81 | 93 | 102 | 207 |
| Ex. 4-2 | 1080-3 | Fe 0.1 | 500.2 | 405.8 | 0.80 | 95 | 98 | 201 |
| Comp. Ex. 4-1 | 1080-3 | Fe 0.15 | 500.8 | 406.2 | 0.77 | 97 | 91 | 173 |
| Ex. 4-3 | 1080-3 | Ca 0.05 | 500.5 | 405.5 | 0.82 | 92 | 103 | 213 |

TABLE 4-continued

| Example & Compara. Example | Heat Treatment (° C.-hr) | $X_y$ (molar ratio) | Lattice Length (a/pm) | Lattice Length (c/pm) | PCT Capacity (H/M) | Grain Size Retention (%) | Relative Magnetization (%) | Discharge Characteristics (mAh/g) |
|---|---|---|---|---|---|---|---|---|
| Ex. 4-4 | 1080-3 | Cn 0.1 | 500.6 | 405.7 | 0.81 | 91 | 101 | 212 |
| Comp. Ex. 4-2 | 1080-3 | Cu 0.15 | 500.7 | 406.0 | 0.78 | 82 | 84 | 193 |

As is apparent from the results in Tables 1 through 4, Examples have a PCT capacity, a grain size retention and discharge characteristics in good balance on higher levels than Comparative Examples, substantially equally to the conventional 10 wt % Co-containing hydrogen storage material (Reference Example 1-1). It is also understood that Examples generally have a higher relative magnetization than Comparative Examples, being superior in initial activation.

Industrial Applicability:

The hydrogen storage material of the present invention has an extremely reduced cobalt content and therefore enjoys a reduction in production cost. It is excellent in resistance against grain size reduction and hydrogen storage characteristics and satisfactory in discharge characteristics and initial activation.

The production process according to the present invention provides the above-described hydrogen storage material stably and efficiently.

What is claimed is:

1. A hydrogen storage material which is an $AB_5$ hydrogen storage alloy having a $CaCu_5$ crystal structure represented by general formula:

$$MmNi_aMn_bAl_cCo_d$$

wherein Mm denotes a misch metal, $4.0 < a \leq 4.3$, $0.25 \leq b \leq 0.4$, $0.25 \leq c \leq 0.4$, $0.3 \leq d \leq 0.5$, and $5.05 \leq a+b+c+d \leq 5.25$, characterized in that the lattice length on the c-axis is 404.9 to 405.8 pm.

2. The hydrogen storage material according to claim 1, wherein (a+b+c+d) is 5.05 or greater and smaller than 5.15, and said lattice length on the c-axis is from 404.9 to 405.4 pm.

3. The hydrogen storage material according to claim 1, wherein (a+b+c+d) is from 5.15 to 5.25, and said lattice length on the c-axis is from 405.4 to 405.8 pm.

4. A process for producing a hydrogen storage material comprising heat-melting raw materials of a hydrogen storage material, casting the melt, and heat treating the resulting alloy in an inert gas atmosphere to produce an $AB_5$ hydrogen storage material having a $CaCu_5$ crystal structure represented by the following general formula, characterized in that the casting temperature is 1350 to 1550° C., the pouring temperature is 1200 to 1450° C., and conditions of said heat treating are 1070 to 1100° C. and 1 to 6 hours, General formula:

$$MmNi_aMn_bAl_cCo_d$$

wherein Mm denotes a misch metal, $4.0 < a \leq 4.3$, $0.25 \leq b \leq 0.4$, $0.25 \leq c \leq 0.4$, $0.3 \leq d \leq 0.5$, and $5.05 \leq a+b+c+d \leq 5.25$.

5. A hydrogen storage material which is an $AB_5$ hydrogen storage alloy having a $CaCu_5$ crystal structure represented by general formula:

$$MmNi_aMn_bAl_cCo_dX_e$$

wherein Mm denotes a misch metal, X is Cu and/or Fe, $4.0 < a \leq 4.3$, $0.25 \leq b \leq 0.4$, $0.25 \leq c \leq 0.4$, $0.3 \leq d \leq 0.5$, $0 < e \leq 0.1$, and $5.05 \leq a+b+c+d+e \leq 5.25$, characterized in that the lattice length on the c-axis is 404.9 to 405.8 pm.

6. The hydrogen storage material according to claim 5, wherein (a+b+c+d+e) is 5.05 or greater and smaller than 5.15, and said lattice length on the c-axis is from 404.9 to 405.4 pm.

7. The hydrogen storage material according to claim 5, wherein (a+b+c+d+e) is from 5.15 to 5.25, and said lattice length on the c-axis is from 405.4 to 405.8 pm.

8. A process for producing a hydrogen storage material comprising heat-melting raw materials of a hydrogen storage material, casting the melt, and heat treating the resulting alloy in an inert gas atmosphere to produce an $AB_5$ hydrogen storage material having a $CaCu_5$ crystal structure represented by the following general formula, characterized in that the casting temperature is 1350 to 1550° C., the pouring temperature is 1200 to 1450° C., and conditions of said heat treating are 1070 to 1100° C. and 1 to 6 hours, General formula:

$$MmNi_aMn_bAl_cCo_dX_e$$

wherein Mm denotes a misch metal, X is Cu and/or Fe, $4.0 < a \leq 4.3$, $0.25 \leq b \leq 0.4$, $0.25 \leq c \leq 0.4$, $0.3 \leq d \leq 0.5$, $0 < e \leq 0.1$, and $5.05 \leq a+b+c+d+e \leq 5.25$.

* * * * *